United States Patent
Hsu et al.

(10) Patent No.: US 10,659,393 B2
(45) Date of Patent: May 19, 2020

(54) METHOD AND DEVICE FOR MONITORING TRAFFIC IN A NETWORK

(71) Applicant: Industrial Technology Research Institute, Hsinchu (TW)

(72) Inventors: Ming-Hung Hsu, Hsinchu County (TW); Tzi-Cker Chiueh, Taipei (TW); Yu-Wei Lee, Taoyuan (TW); Yi-An Chen, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 20 days.

(21) Appl. No.: 16/211,177

(22) Filed: Dec. 5, 2018

(65) Prior Publication Data

US 2019/0190851 A1 Jun. 20, 2019

(30) Foreign Application Priority Data

Dec. 14, 2017 (TW) .............................. 106143934 A

(51) Int. Cl.
*H04L 12/947* (2013.01)
*H04L 12/24* (2006.01)
(Continued)

(52) U.S. Cl.
CPC ............ *H04L 49/25* (2013.01); *H04L 12/413* (2013.01); *H04L 12/4641* (2013.01);
(Continued)

(58) Field of Classification Search
None
See application file for complete search history.

(56) References Cited

U.S. PATENT DOCUMENTS 9,008,080 B1 * 4/2015 Mehta .................... H04L 49/60
370/327
2008/0219247 A1 * 9/2008 Ford ....................... H04L 45/00
370/360
(Continued)

FOREIGN PATENT DOCUMENTS

| CN | 104283791 A | 1/2015 |
|---|---|---|
| CN | 106375384 A | 2/2017 |

(Continued)

OTHER PUBLICATIONS

Japan Patent Office, Notice of Allowance, U.S. Appl. No. 2018-231969, dated Oct. 8, 2019, Japan.
(Continued)

*Primary Examiner* — Brian S Roberts

(57) ABSTRACT

A method for monitoring traffic in a network is provided. The method is used in a communication device, wherein the network is formed by switches and hosts. The method includes: collecting LLDP information, VLAN information, host NIC information and host-tenant mapping information to obtain a physical network topology and a plurality of virtual network topologies; detecting a plurality of physical link loads of the physical network topology; obtaining a target path between two of the hosts or between the switches by analyzing the virtual network topologies; selecting one of the switches on the target path to serve as a mirror switch according to the physical link load corresponding to the target path or a hop count; and receiving mirror traffic transmitted from the mirror switch, and performing packet payload analysis on the mirror traffic.

20 Claims, 14 Drawing Sheets

(51) Int. Cl.
  *H04L 12/26* (2006.01)
  *H04L 12/46* (2006.01)
  *H04L 12/933* (2013.01)
  *H04L 29/06* (2006.01)
  *H04L 12/413* (2006.01)
(52) U.S. Cl.
  CPC ........ *H04L 41/0213* (2013.01); *H04L 43/028* (2013.01); *H04L 49/15* (2013.01); *H04L 69/22* (2013.01)

(56) References Cited

U.S. PATENT DOCUMENTS

| | | | |
|---|---|---|---|
| 2012/0233607 A1* | 9/2012 | Kuroda | G06F 9/5077 718/1 |
| 2012/0290711 A1 | 11/2012 | Upham et al. | |
| 2013/0259037 A1* | 10/2013 | Natarajan | H04L 43/026 370/390 |
| 2014/0280829 A1 | 9/2014 | Kjendal et al. | |
| 2015/0256413 A1* | 9/2015 | Du | H04L 41/145 370/216 |
| 2016/0105333 A1 | 4/2016 | Lenglet et al. | |
| 2016/0234091 A1 | 8/2016 | Emmadi et al. | |
| 2019/0116111 A1* | 4/2019 | Izard | H04L 45/02 |

FOREIGN PATENT DOCUMENTS

| | | |
|---|---|---|
| JP | 2015-171128 A | 9/2015 |
| WO | WO 2011155510 A1 | 12/2011 |

OTHER PUBLICATIONS

K. Giotiset al., "Combining OpenFlow and sFlow for an effective and scalable anomaly detection and mitigation mechanism on SDN environments," Computer Networks, Apr. 2014, pp. 122-136, vol. 62, Elsevier, US.

A. R. Curtis et al., "Mahout: Low-overhead data center traffic management using end-host-based elephant detection," 2011 proceedings IEEE INFOCOM, Apr. 2011, pp. 1629-1637, IEEE, US.

V. Mann,et al., "Living on the edge: Monitoring network flows at the edge in cloud data centers," 2013 Fifth Int'l. Conference on Communication Systems and Networks (COMSNETS), Jan. 2013, 9 pages, IEEE, US.

A. Zaalouk et al., "Orchsec: An orchestrator-based Architecture for Enhancing Network-Security Using Network Monitoring and SDN Control Functions," 2014 IEEE Network Operations and Management Symposium (NOMS), May 2014, 9 pages, IEEE, US.

H. Tahaei et al., "A multi-objective software defined network traffic measurement," Measurement 95, Oct. 2016, pp. 317-327, Elsevier, US.

T. Ha et al., "Suspicious traffic sampling for intrusion detection in software-defined networks," Computer Networks: The International Journal of Computer and Telecommunications Networking, Nov. 2016, pp. 172-182, vol. 109, Issue P2, Elsevier, US.

* cited by examiner

METHOD AND DEVICE FOR MONITORING TRAFFIC IN A NETWORK

CROSS REFERENCE TO RELATED APPLICATIONS

The application is based on, and claims priority from Taiwan Patent Application Serial Number 106143934, filed on Dec. 14, 2017, the entire disclosure of which is hereby incorporated by reference herein in its entity.

BACKGROUND

Technical Field

The disclosure relates to network communication technologies, and more particularly, it relates to a method and a device for monitoring traffic in a network.

Description of the Related Art

The mirroring of network traffic is a common feature found in many network relay devices, such as network switches. Network traffic mirroring, or port mirroring, is a method of monitoring network traffic that forwards a copy of incoming and outgoing traffic from one port of a network device, such as a switch, to another port of the network device from which the mirrored network traffic may be studied. Network traffic mirroring provides a service that duplicates network traffic as it passes through a device, and may duplicate all or a portion of the network traffic. Network traffic mirroring may be used for network troubleshooting, network security and performance monitoring, and security audits. A network administrator may use mirroring as a diagnostic tool or debugging feature, such as a tool for investigating network intrusions or network attacks. Network mirroring may be performed and managed locally or remotely.

Current techniques for mirroring data are limited in that they are static. The traffic mirroring has to be manually established and configured. In a system where multiple flows of traffic are to be monitored, multiple traffic mirroring must be set-up and configured. Forwarding traffic mirroring requires bandwidth and, as the distance between the network device and the remote analysis device increases, the additional network load caused by forwarding traffic mirroring also increases. This is inefficient because in some instances a network operator may only want to have certain traffic mirrored, or to mirror traffic only if certain criterion is met.

Therefore, there is a need for a method and device for dynamically monitoring traffic in a network wherein it is not required to manually establish and configure mirror switches. Rather, the method and device for dynamically monitoring traffic in a network may intelligently select a mirror switch in a way that is low-cost and that does not impose a high extra network load. This will enable the network operator to know the sources of network traffic or application services that cause traffic congestion or abnormalities in the network.

SUMMARY

In one of exemplary embodiments, the disclosure is directed to a method for monitoring traffic in a network used in a communication device, wherein the network is formed by switches and hosts. The method comprises: collecting link layer discovery protocol (LLDP) information, virtual local area network (VLAN) information, host network interface card (NIC) information and host-tenant mapping information to obtain a physical network topology and a plurality of virtual network topologies; detecting a plurality of physical link loads of the physical network topology; obtaining a target path between two of the hosts or between the switches by analyzing the virtual network topologies; selecting one of the switches on the target path to serve as a mirror switch according to the physical link load corresponding to the target path or a hop count; and receiving mirror traffic transmitted from the mirror switch and performing packet payload analysis on the mirror traffic.

In one of exemplary embodiments, the step of obtaining the target path between one of the hosts and another host or between the switches by analyzing the virtual network topologies further comprises: selecting a highest physical link load from the physical link loads and obtaining a first physical link corresponding to the highest physical link load by analyzing the physical network topology; and obtaining the target path by analyzing packet types of packets passing through the first physical link and the traffic load of each packet type.

In one of exemplary embodiments, the step of detecting the physical link loads of the physical network topology is implemented by performing a simple network management protocol (SNMP).

In one of exemplary embodiments, the step of obtaining the target path by analyzing the packet types of packets passing through the first physical link and the traffic load of each packet type comprises: receiving header information transmitted by a first switch and a second switch, wherein the header information is generated according to headers of sampled packets encapsulated by the first switch and the second switch, and the first physical link is connected to the first switch and the second switch; obtaining the packet types of packets passing through the first physical link and the traffic load of each packet type according to the header information; and selecting a physical path corresponding to the packet type with the highest traffic load as the target path.

In one of exemplary embodiments, the step of selecting one of the switches on the target path as the mirror switch comprises: obtaining a plurality of candidate switches forming the target path and link loads corresponding to the candidate switches; and selecting the mirror switch from the candidate switches according to the link load corresponding to each candidate switch or the hop count corresponding to each candidate switch; wherein the hop count is the number of links between each candidate switch and the communication device.

In some embodiments, before receiving the mirror traffic transmitted from the mirror switch, the method further comprises: setting a plurality of filtering rules on an Open-Flow switch; filtering the mirror traffic according to the filtering rules; and receiving the filtered mirror traffic filtered by the OpenFlow switch.

In one of exemplary embodiments, before the mirror switch transmits the mirror traffic, the mirror switch adds a virtual local area network (VLAN) tag field to headers of packets of the mirror traffic.

In one of exemplary embodiments, before the mirror switch transmits the mirror traffic, the mirror switch adds a class of service (CoS) field to headers of packets of the mirror traffic.

In one of exemplary embodiments, the switches are OpenFlow switches.

In one of exemplary embodiments, the network is an Ethernet network.

In one of exemplary embodiments, the disclosure is directed to a communication device for monitoring traffic in a network, wherein the network is formed by switches and hosts. The communication device comprises: a control circuit, a processor and a memory. The control circuit is installed in the control circuit. The memory is installed in the control circuit and operatively coupled to the processor. The processor is configured to execute program codes stored in the memory to: collect link layer discovery protocol (LLDP) information, virtual local area network (VLAN) information, host network interface card (NIC) information and host-tenant mapping information to obtain a physical network topology and a plurality of virtual network topologies; detect a plurality of physical link loads of the physical network topology; analyze the virtual network topologies to obtain a target path between two of the hosts or between the switches; select one of the switches on the target path to serve as a mirror switch according to the physical link load corresponding to the target path or a hop count; and receive mirror traffic transmitted from the mirror switch and perform packet payload analysis on the mirror traffic.

BRIEF DESCRIPTION OF DRAWINGS

The accompanying drawings are included to provide a further understanding of the disclosure, and are incorporated in and constitute a part of the disclosure. The drawings illustrate implementations of the disclosure and, together with the description, serve to explain the principles of the disclosure. It should be appreciated that the drawings are not necessarily to scale as some components may be shown out of proportion to the size in actual implementation in order to clearly illustrate the concept of the disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

Exemplary embodiments of the disclosure are supported by standard documents disclosed for at least one of wireless network systems including an Institute of Electrical and Electronics Engineers (IEEE) 802 system, a 3rd Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the disclosure, in the exemplary embodiments of the disclosure may be supported by the above documents. All terminology used herein may be supported by at least one of the above-mentioned documents.

Figure 1A:
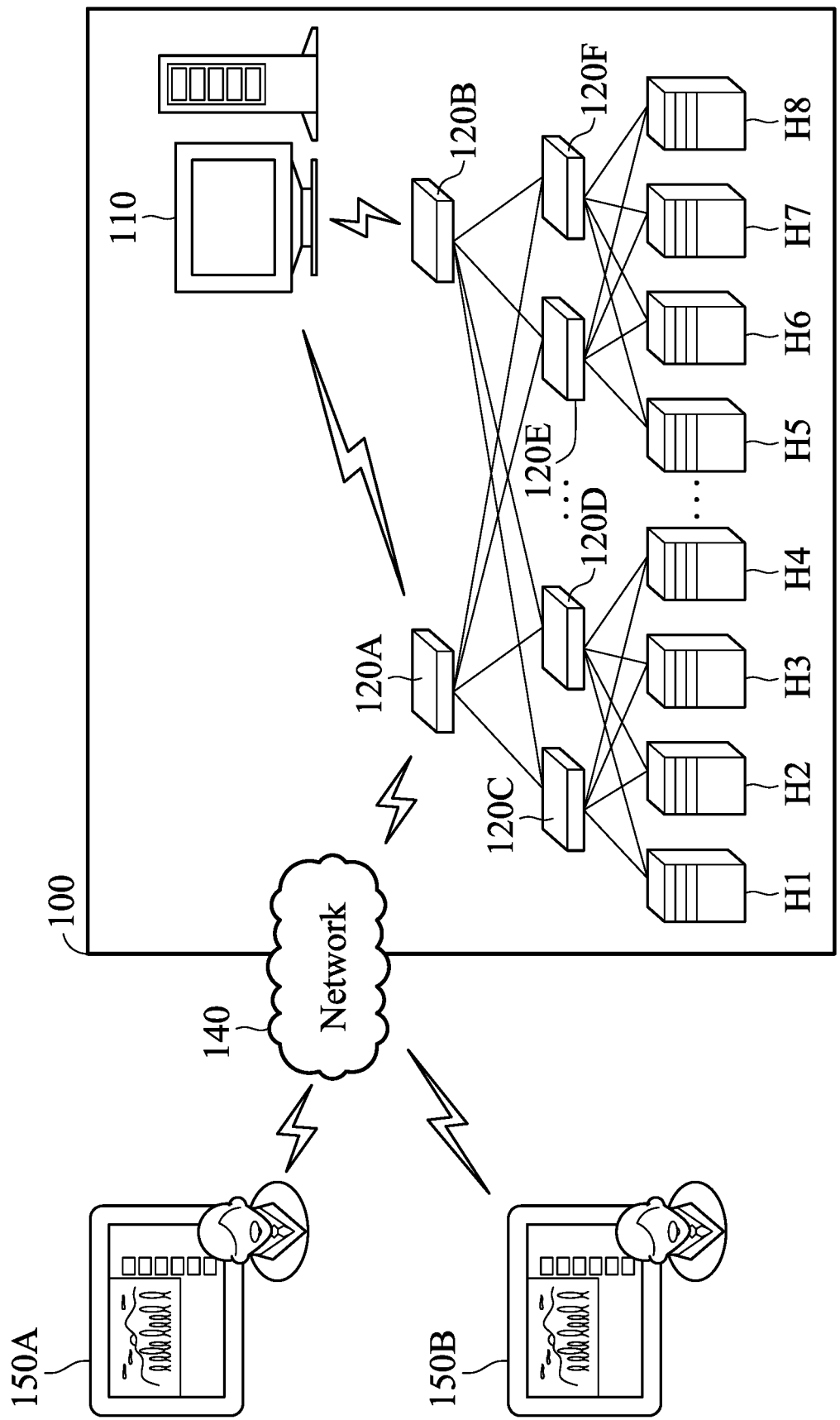
FIGS. 1A~1E show exemplary schematic diagrams illustrating an exemplary embodiment of a network system according the disclosure.

FIG. 1A shows an exemplary schematic diagram illustrating a network system 100 according to an exemplary embodiment of the disclosure. As shown in FIG. 1A, the network system 100 at least comprises switches 120A to 120F and physical hosts H1 to H8.

Each switch 120A to 120F all has a plurality of connecting ports. Each switch 120A to 120F respectively connects to the physical hosts H1 to H8 via the connecting ports on the switch. The physical hosts H1 to H8 may belong to different virtual local area networks (VLANs). The tenants 150A and 150B outside the network system 100 may connect to and rent the physical hosts H1 to H8 through the network 140. In an exemplary embodiment, the network system 100 is a physical machine leasing service (PHLS) system. In another exemplary embodiment, an Ethernet network is used in the network system 100.

In addition, the network system 100 may further comprise a cloud management device 110. The cloud management device 110 is configured to handle services such as configuration between the tenants 150A and 150B and the physical hosts H1 to H8 and network virtualization.

The cloud management device 110 can manage host network interface card (NIC) information and host-tenant mapping information. The host NIC information may be mapping relationship between a host and a switch port. For example, which ports on the switches 120A to 120F are respectively connected to which network interface cards of the physical hosts H1 to H8. The host-tenant mapping information may be the mapping information between a host and a tenant. For example, which hosts are leased to the tenant A, and which hosts respectively belong to which virtual local area networks, and so on.

The cloud management device 110 may further collect, through a simple network management protocol (SNMP), link layer discovery protocol (LLDP) information and VLAN information stored by each switch in a management information base (MIB).

Figure 1B:
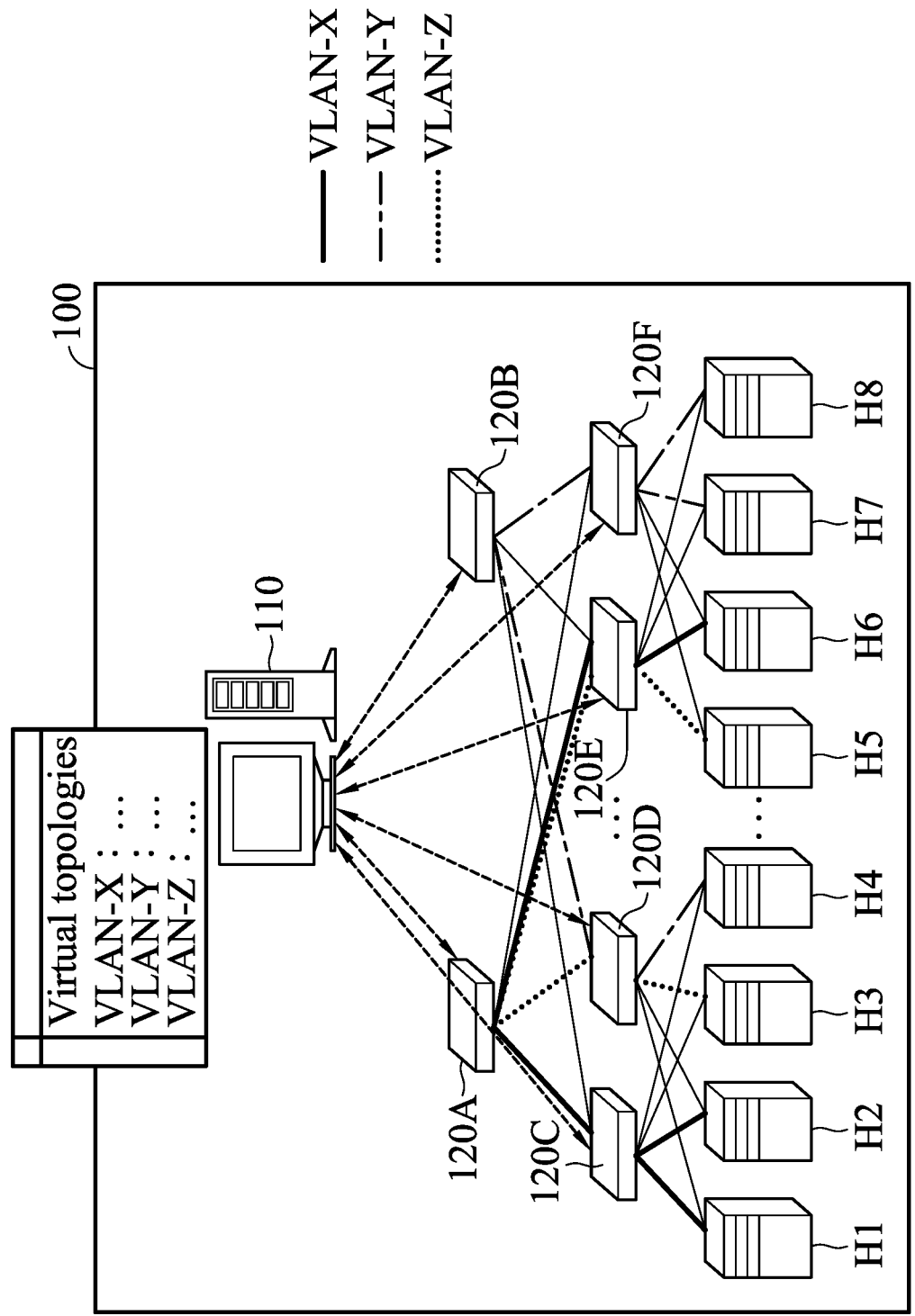

The cloud management device 110 obtains a physical network topology and a plurality of virtual network topologies according to the LLDP information, the VLAN information, the host NIC information, and the host-tenant mapping information. As shown in FIG. 1B, the cloud management device 110 establishes three virtual network topologies, namely, VLAN-X, VLAN-Y and VLAN-Z.

Figure 1C:
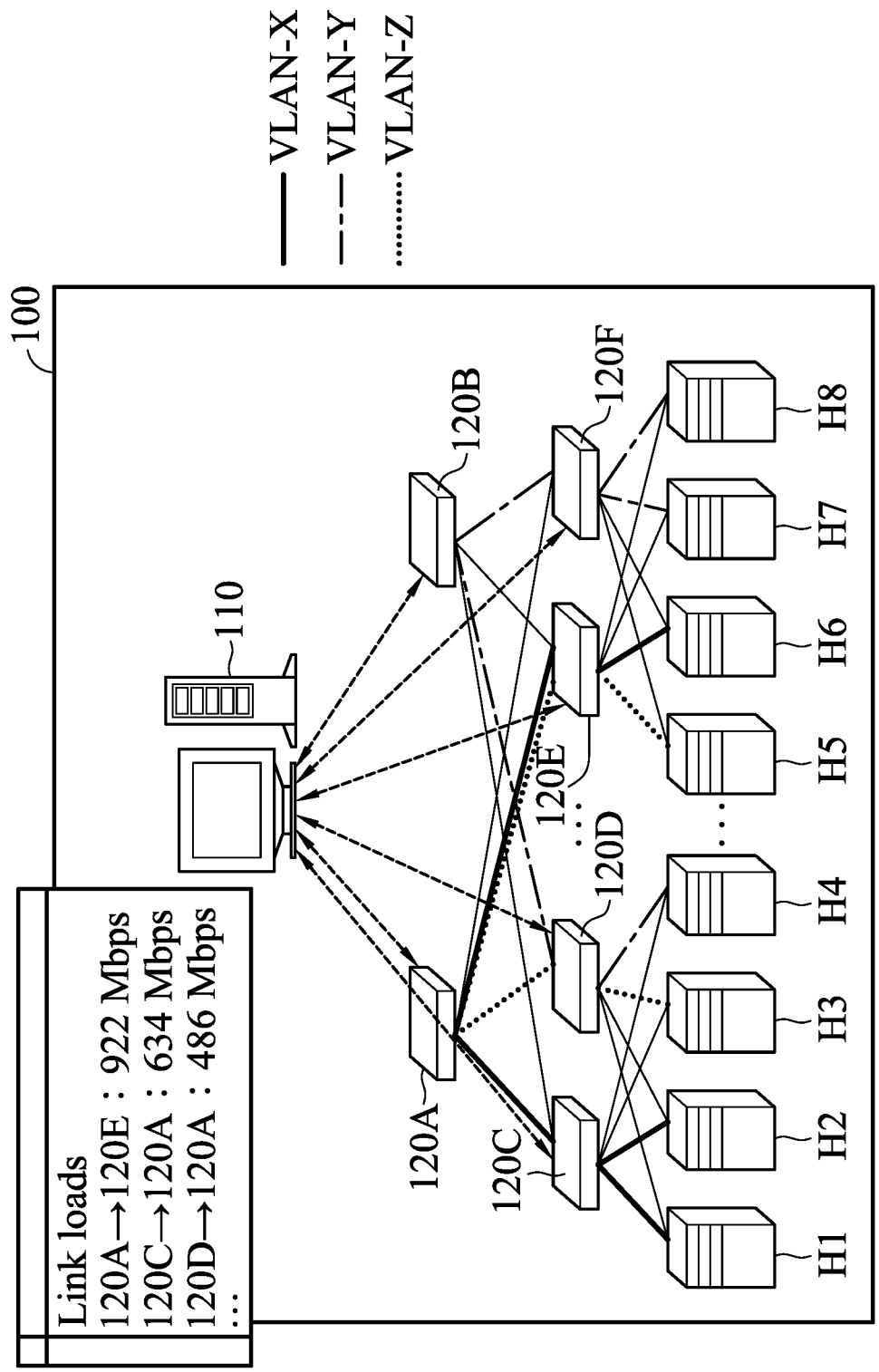

The cloud management device 110 detects all physical link loads of the physical network topology. Specifically, the cloud management device 110 may periodically poll the ports of the switches 120A to 120F according to the physical network topology by using the SNMP to detect all physical link loads between the switches 120A to 120F. As shown in FIG. 1C, the cloud management device 110 can detect the three links with the three highest physical link loads. For example, the physical link load from the switch 120A to the switch 120E is 922 Mbps, the physical link load from the switch 120C to the switch 120A is 634 Mbps, and the physical link load from the switch 120D to the switch 120A is 486 Mbps.

The cloud management device 110 obtains a target path between one of the physical hosts H1 to H8 and another physical host or between the switches 120A to 120F by analyzing the virtual network topology. The detailed process of obtaining the target path by the cloud management device will be described below with reference to FIGS. 1C and 1D.

The cloud management device 110 may select the highest physical link load among all physical link loads and may obtain a first physical link corresponding to the highest physical link load. The cloud management device 110 then obtains a target path by analyzing the first physical link. Specifically, the cloud management device 110 obtains a first physical link (the physical link from the switch 120A to the switch 120E) corresponding to the highest physical link load in FIG. 1C. Each of the switches 120A~120F samples the received packet at a sampling frequency, and extracts the header of the sampled packet, encapsulates a specific protocol header in header information, and then sends the header information to the cloud management device 110, wherein the specific protocol can be, for example, sFlow, NetFlow, IPFIX, OpenFlow and so on. In another exemplary embodiment, the cloud management device 110 can dynamically change the packet sampling frequency of each switch.

Figure 1D:
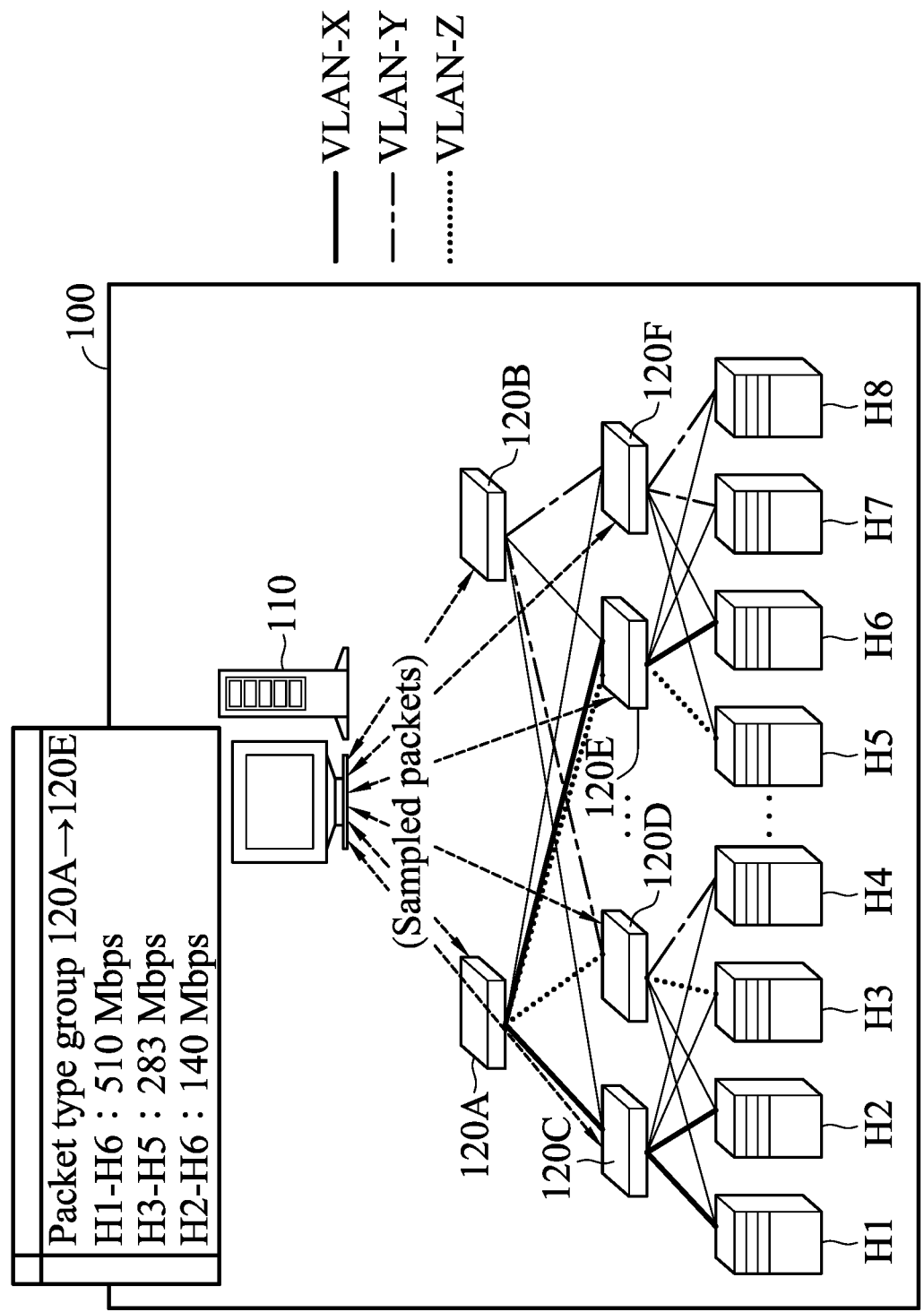

The cloud management device 110 obtains the packet types of the packets passing through the first physical link and a transmission load of each packet type according to the header information of the sampled packets received from the switches 120A~120F, wherein the packet type of each packet is determined according to a VLAN-ID, a source IP address, a destination IP address, a source MAC address, a destination MAC address, and a TCP/UDP port number. Packets with a plurality of different packet types can be regarded as a packet type group. In the exemplary embodiment, packets with all packet types with the same source IP address and the same destination IP address are regarded as the same packet type group. For example, packets of all packet types whose source host is H1 and whose destination host is H6 are regarded as the same packet type group. However, the classification conditions of packet type group can be adjusted according to system management requirements. As shown in FIG. 1D, the transmission load of the packet type group corresponding to the path from the physical host H1 to H6 is 510 Mbps. The transmission load of the packet type group corresponding to the path from the physical hosts H3 to H5 is 283 Mbps. The transmission load of the packet type group corresponding to the path from the physical hosts H2 to H6 is 140 Mbps.

The cloud management device 110 selects a packet type group with the largest transmission load as the target packet type group. Then, the cloud management device 110 obtains what the virtual path that the target packet type group passes through is according to the virtual network topology, and uses the physical path corresponding to the virtual path (that is, the path from the physical host H1 to H6) as the target path.

Figure 1E:
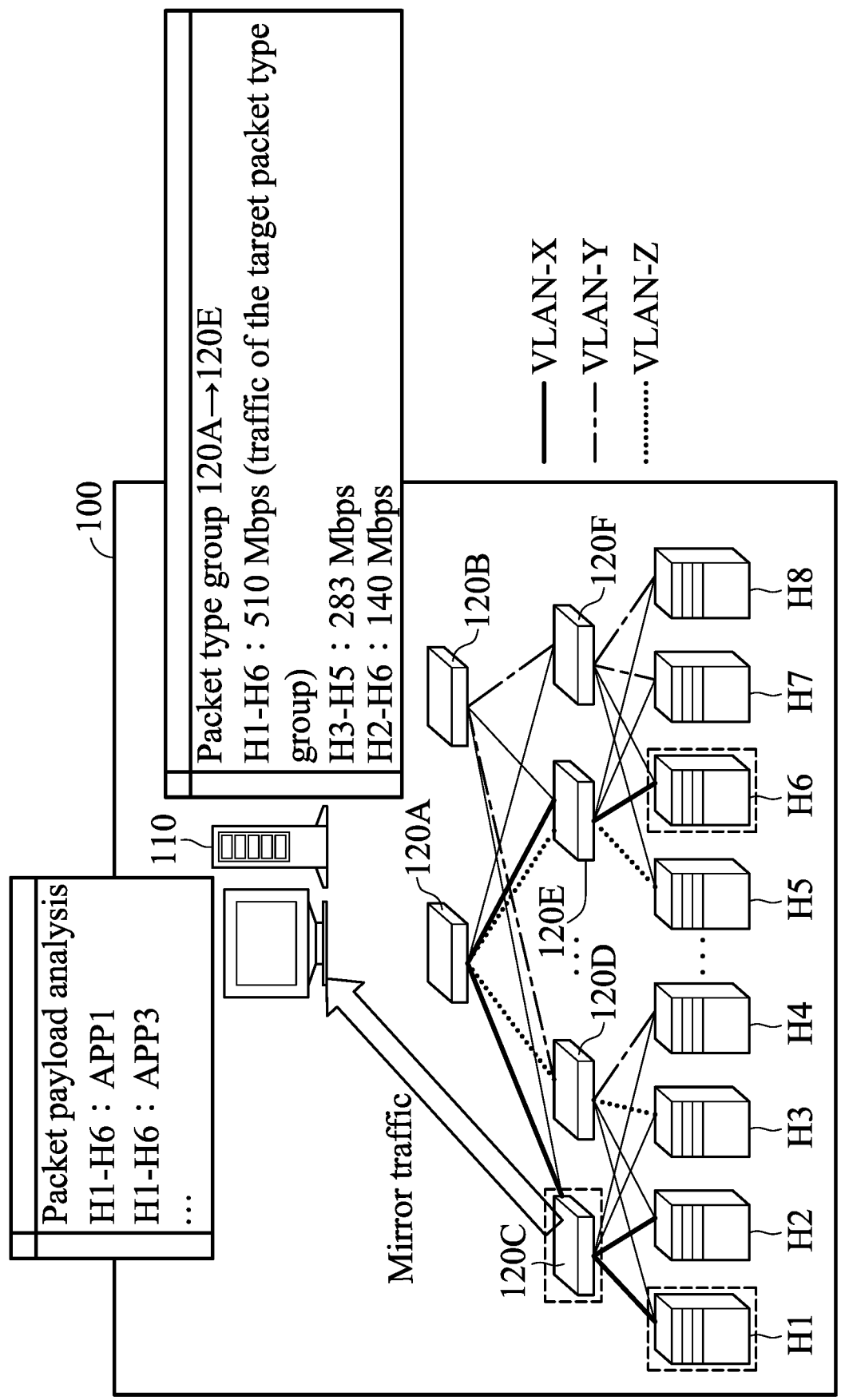

The cloud management device 110 may obtain physical link loads of a plurality of switch ports corresponding to the target path or a hop count according to the target path. The cloud management device 110 can then select one of the switches on the target path as a mirror switch according to the physical link load corresponding to the target path or the hop count, and may receive mirror traffic transmitted by the mirror switch to perform a packet payload analysis on the mirror traffic. As shown in FIG. 1E, it is assumed that the cloud management device 110 selects the packets from the physical hosts H1 to H6 as a target packet type group, and the switch 120C on the target path (H1→120C→120A→120E→H6) corresponding to the target packet type group is used as a mirror switch. The cloud management device 110 can control the switch 120C to start the mirroring mechanism for the port of 120C-120A (or the port of H1-120C), and monitors the mirror traffic from the mirror switch 120C to analyze the traffic of the applications executed in the physical hosts H1 to H6. In addition, how the cloud management device 110 selects a mirror switch on the target path will be further explained below.

Figure 2:
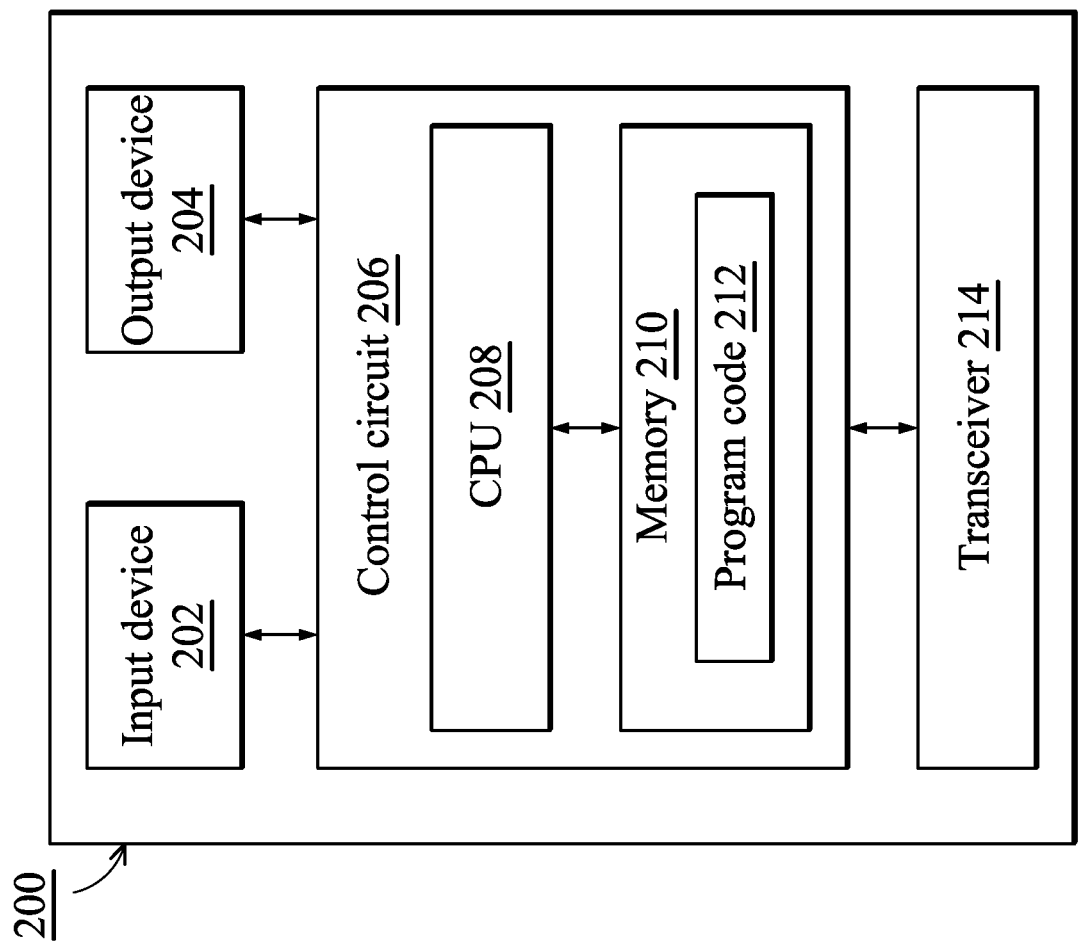
FIG. 2 shows a simplified functional block diagram of a communication device according to the disclosure.

FIG. 2 shows a simplified functional block diagram of a communication device 200 according to one exemplary embodiment of the disclosure. As shown in FIG. 2, the communication device 200 can be utilized for realizing the cloud management device 110 or the physical hosts H1 to H8 in the network system 100 of FIGS. 1A to 1E, and the communication device 200 may be used in the LTE system, the LTE-A system or other system which is approximate to the two systems described above. The communication device 200 may include an input device 202, an output device 204, a control circuit 206, a central processing unit (CPU) 208, a memory 210, a program code 212, and a transceiver 214. The control circuit 206 executes the program code 212 in the memory 210 through the CPU 208, thereby controlling the operation of the wireless communication device 200. The communication device 200 can receive signals input by a user through the input device 202, such as a keyboard or keypad, and can output images and sounds through the output device 204, such as a monitor or speakers. The transceiver 214 is used to receive and transmit wireless signals wirelessly, deliver received signals to the control circuit 206, and output signals generated by the control circuit 206.

Figure 3:
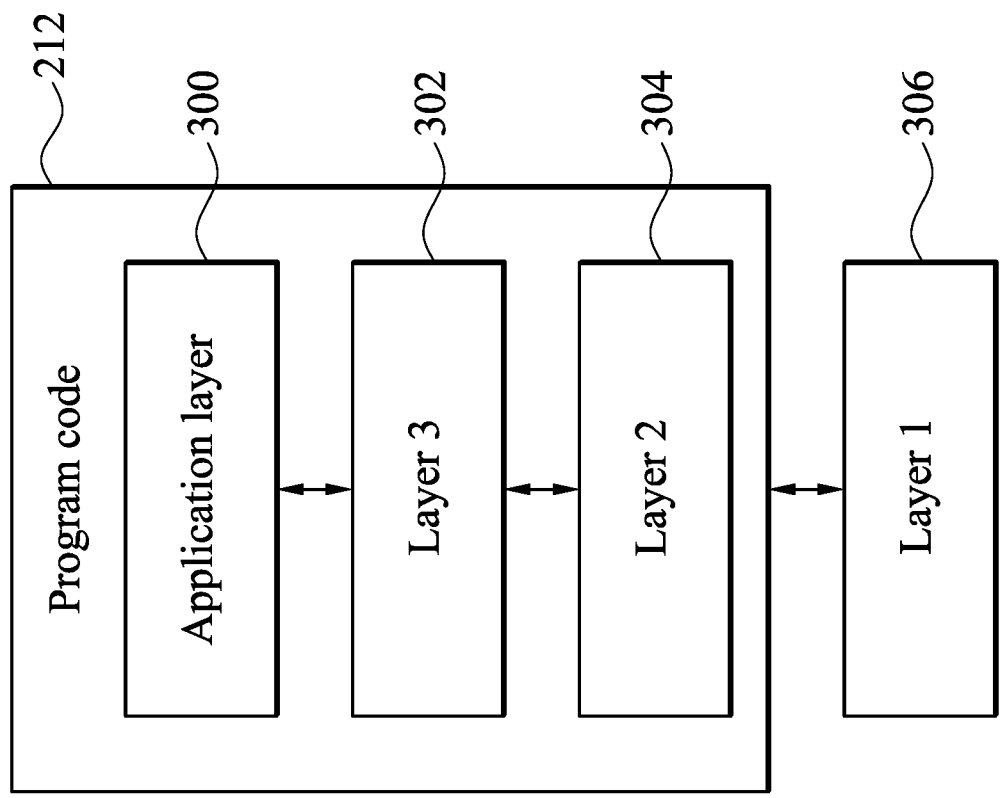
FIG. 3 is a simplified block diagram of the program code shown in FIG. 2 in accordance with the disclosure.

FIG. 3 is a simplified block diagram of the program code 212 shown in FIG. 2 in accordance with one exemplary embodiment of the disclosure. In this exemplary embodiment, the program code 212 includes an application layer 300, a Layer 3 portion 302, and a Layer 2 portion 304, and is coupled to a Layer 1 portion 306. The Layer 3 portion 302 generally performs radio resource control. The Layer 2 portion 304 generally performs link control. The Layer 1 portion 306 generally performs physical connections.

Figure 4:
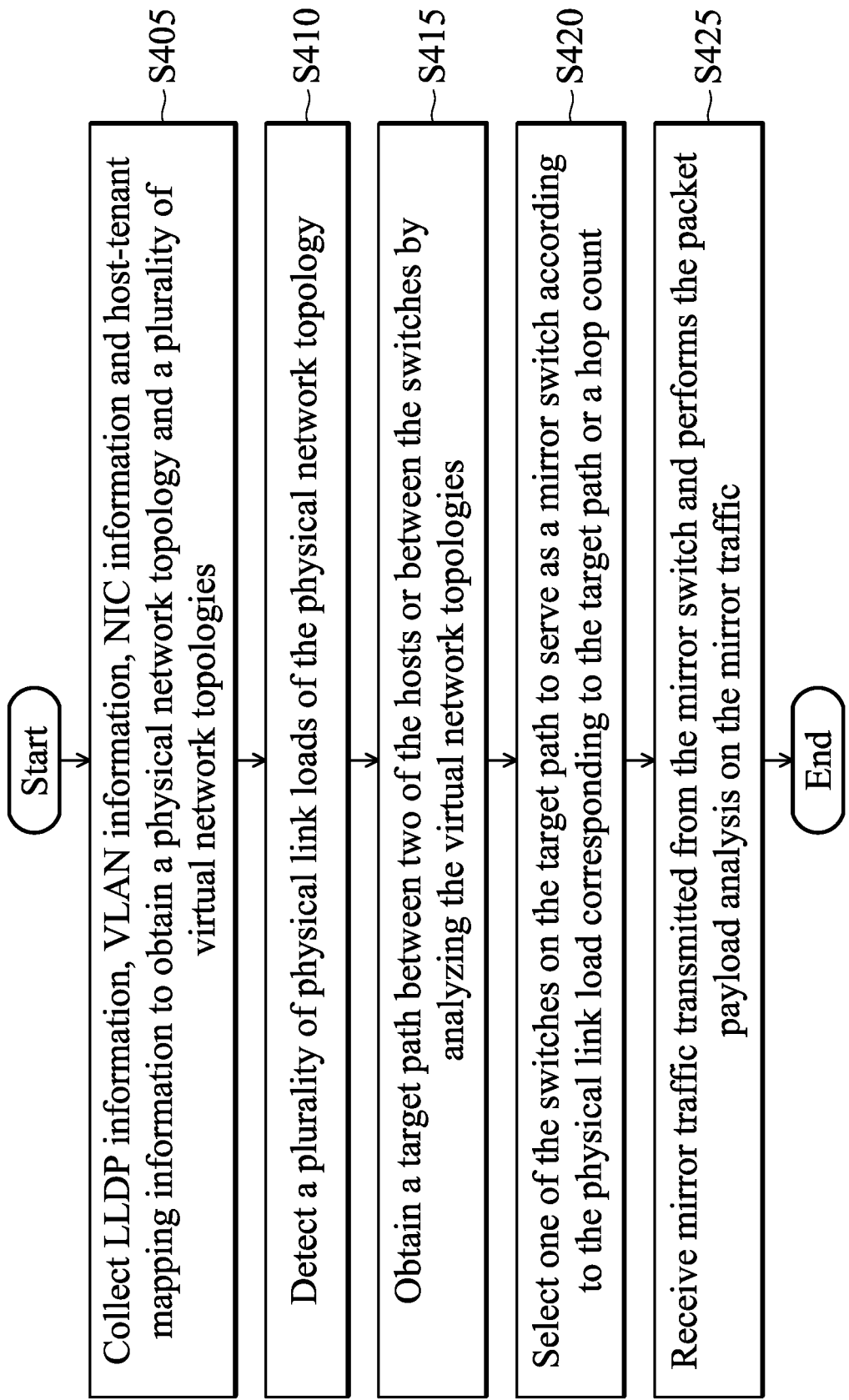
FIG. 4 is a flow chart of an exemplary embodiment of a method for monitoring traffic in a network according to the disclosure.

FIG. 4 is a flow chart of a method for monitoring traffic in a network according to an exemplary embodiment of the disclosure. The method is used in a communication device, wherein the network is formed by switches and hosts. In step S405, the communication device collects link layer discovery protocol (LLDP) information, virtual local area network (VLAN) information, host network interface card (NIC) information and host-tenant mapping information to obtain a physical network topology and a plurality of virtual network topologies. In step S410, the communication device detects a plurality of physical link loads of the physical network topology. In step S415, the communication device obtains a target path between two of the hosts or between the switches by analyzing the virtual network topologies. In step S420, the communication device selects one of the switches on the target path to serve as a mirror switch according to the physical link load corresponding to the target path or a hop count. In step S425, the communication device receives mirror traffic transmitted from the mirror switch and performs the packet payload analysis on the mirror traffic.

Figure 5:
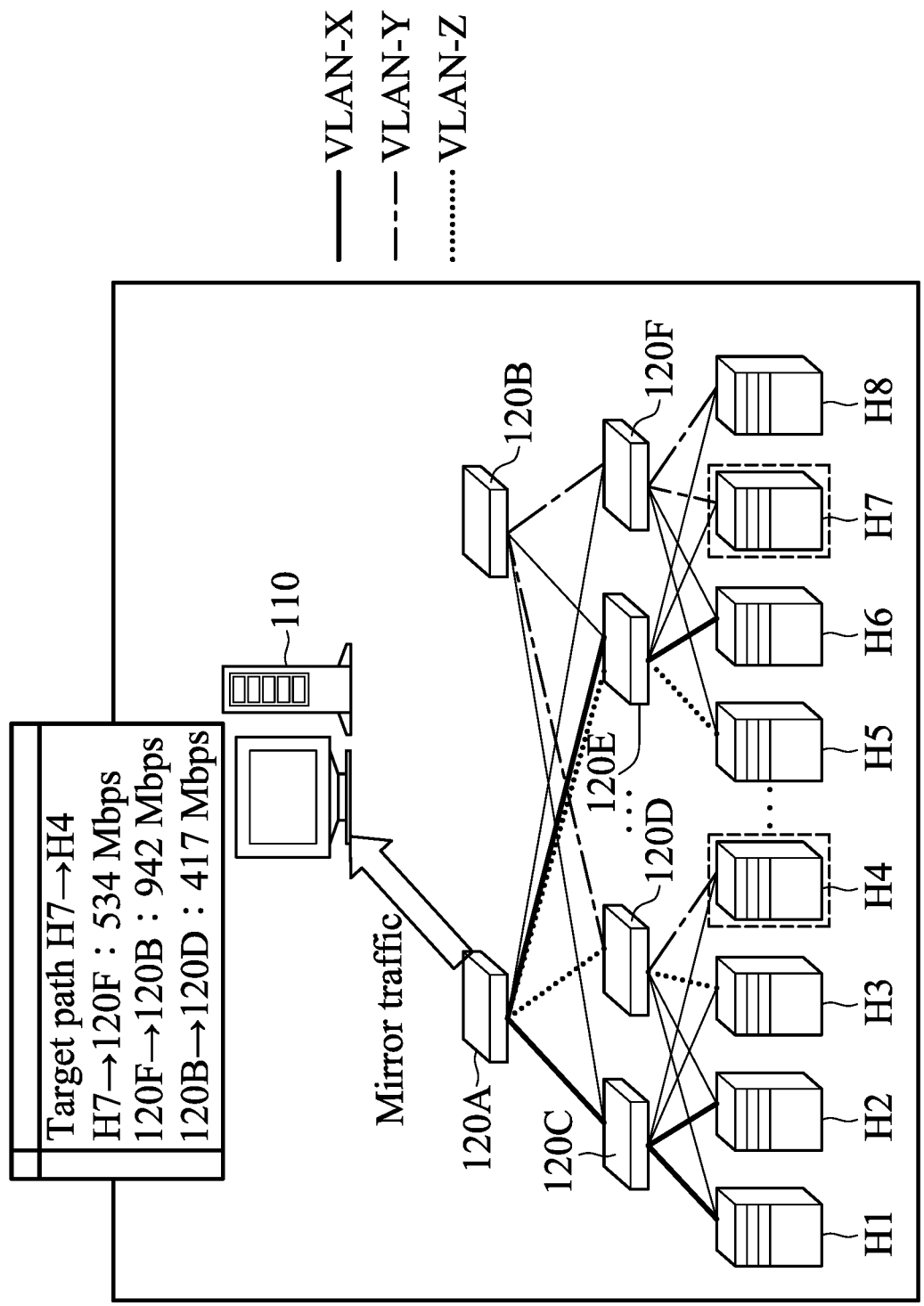
FIG. 5 is a schematic diagram of selecting a mirror switch on a target path by the cloud management device according to the disclosure.

FIG. 5 is a schematic diagram of selecting a mirror switch on a target path by the cloud management device 110 according to an exemplary embodiment of the disclosure. In FIG. 5, it is assumed that the target packet type group is one or more packet types from H7 to H4 (that is, packets of all packet types whose source host is H7 and whose destination host is H4), and the target path corresponding to the target packet type group is from the host H7 to host H4 (H7→120F→120B→120D→H4). The cloud management device 110 may first obtain a plurality of candidate switches forming the target path and link loads corresponding to the candidate switches. For example, the plurality of candidate switches forming the target path are the switch 120F, the switch 120B, and the switch 120D. The overhead of each candidate switch can be expressed as follows:

$$\text{Overhead}(N) = L_N \times H_N \quad (1)$$

wherein N is represented as a switch, $L_N$ is the link load of the input port corresponding to the switch and $H_N$ is a hop count corresponding to the candidate switch N. The hop count is the number of links between the switch and the cloud management device 110.

In this example, it is assumed that the overhead of each link on the target path can be: the overhead of the link from the host H7 to the switch 120F is 534 Mbps, the overhead of the link from the switch 120F to the switch 120B is 942 Mbps, and the overhead of the link from the switch 120B to the switch 120D is 417 Mbps. The overhead of each candidate switch can be calculated according to the formula (1), as shown in Table 1.

TABLE 1

| Candidate switch | Overhead |
|---|---|
| Switch 120F | 534 × 2 = 1068 |
| Switch 120B | 942 × 3 = 2826 |
| Switch 120D | 417 × 2 = 834 |

In Table 1, since the switch 120D has a minimum overhead 834, the cloud management device 110 selects the switch 120D as a mirror switch. The cloud management device 110 then receives the mirror traffic transmitted by the switch 120D and performs the packet payload analysis on the mirror traffic.

Figure 6:
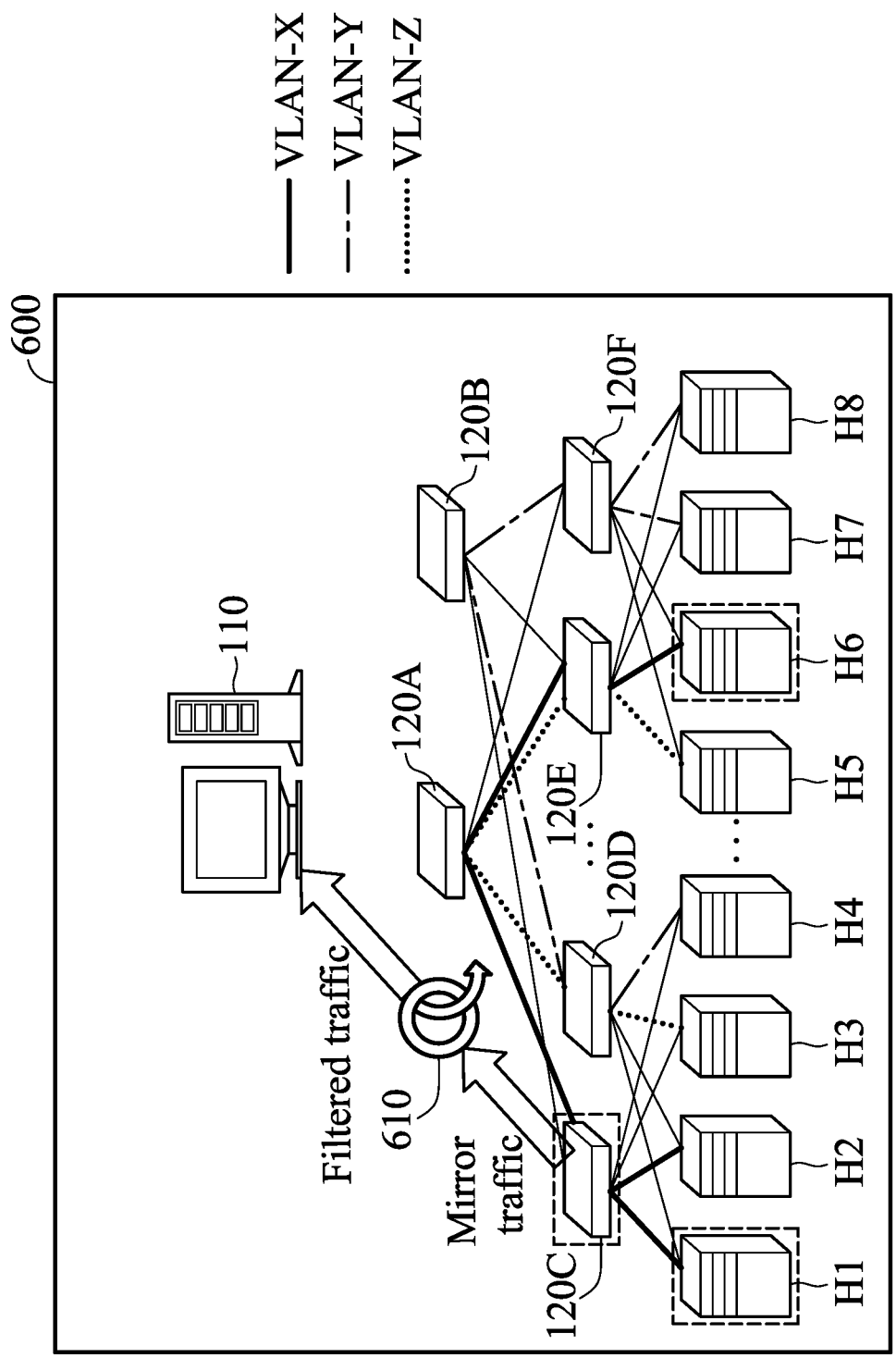
FIG. 6 is a schematic diagram of an OpenFlow switch used in a network system in accordance with the disclosure.

FIG. 6 is a schematic diagram of an OpenFlow switch 610 used in a network system 600 in accordance with an exemplary embodiment of the disclosure. In the exemplary embodiment, it is assumed that switch 120C is a mirror switch. As shown in FIG. 6, the OpenFlow switch 610 can be used to filter the traffic to reduce the traffic received by the cloud management device 110 before the cloud management device 110 receives the mirror traffic transmitted by the mirror switch. The cloud management device 110 can set a plurality of filtering rules in the OpenFlow switch 610. In the exemplary embodiment, one of the filtering rules may be whether the value of the VLAN tag field in the packet is a virtual network identifier which belongs to the target packet type group. When the OpenFlow switch 610 determines that the value of the VLAN tag field in the packet is the virtual network identifier which belongs to the target packet type group, the OpenFlow switch 610 transmits the packet to the cloud management device 110. When the OpenFlow switch 610 determines that the value of the VLAN tag field in the packet is not the virtual network identifier which belongs to the target packet type group, the OpenFlow switch 610 discards the packet. Therefore, the mirror traffic received by the cloud management device 110 is the filtered traffic that has been filtered by the OpenFlow switch 610. The cloud management device 110 can perform the packet payload analysis on the filtered traffic.

Figure 7A:
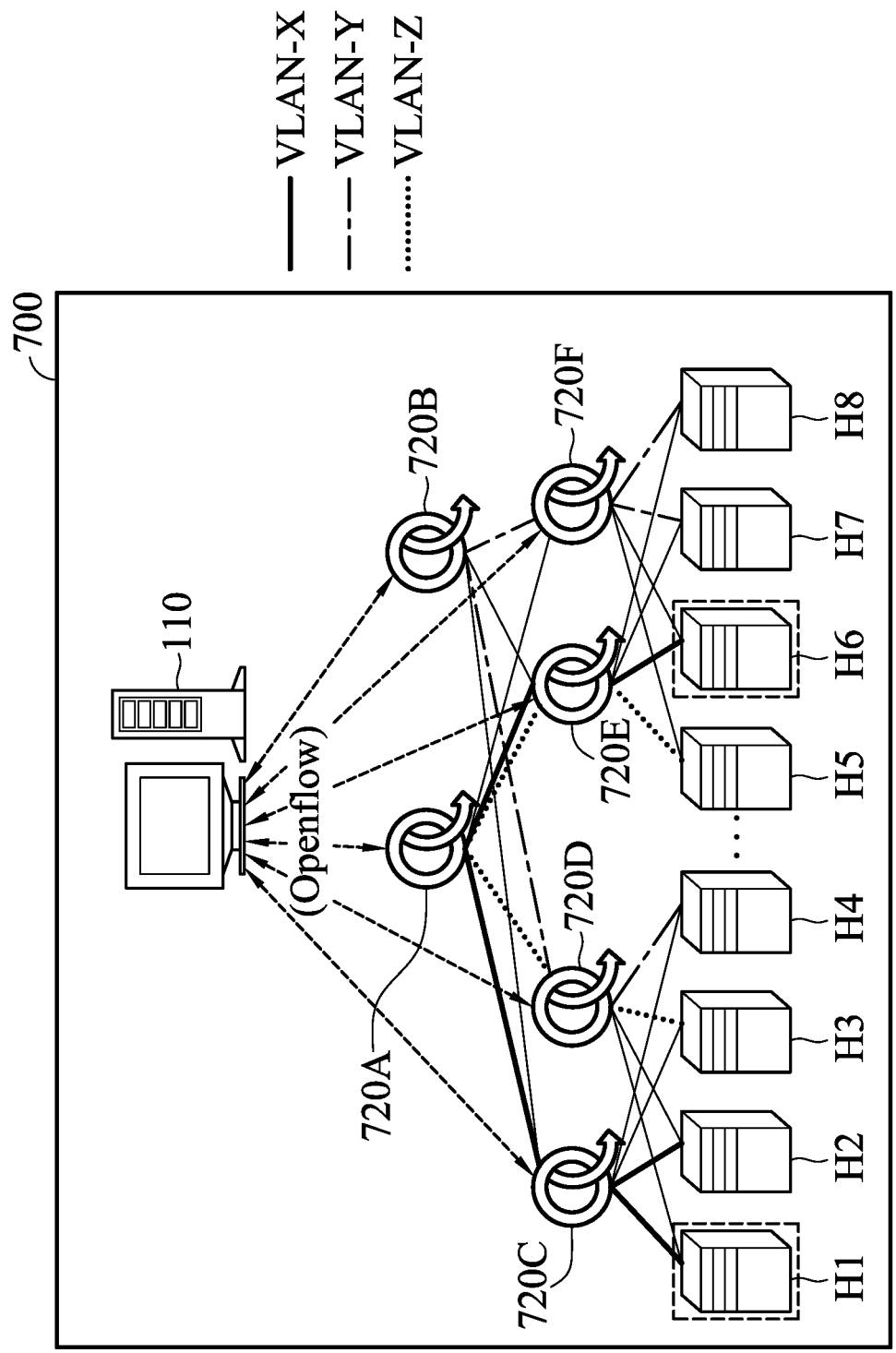
FIG. 7A is a schematic diagram of an OpenFlow switch used as a physical network switch in a network system in accordance with the disclosure.

FIG. 7A is a schematic diagram of an OpenFlow switch used as a physical network switch in a network system 700 in accordance with an exemplary embodiment of the disclosure. As shown in FIG. 7A, the switches 120A~120F in the network system 700 can be replaced by the OpenFlow switches 720A~720F. In the exemplary embodiment, instead of the SNMP protocol, the cloud management device 110 can use the OpenFlow protocol to detect all link loads. In addition, the OpenFlow switches 720A~720F have to support the technique of packet sampling and report the sampled packets to the cloud management device 110. In another exemplary embodiment, the cloud management device 110 can also control the OpenFlow switches 720A~720F to implement the mechanism of the mirror transmission.

Figure 7B:
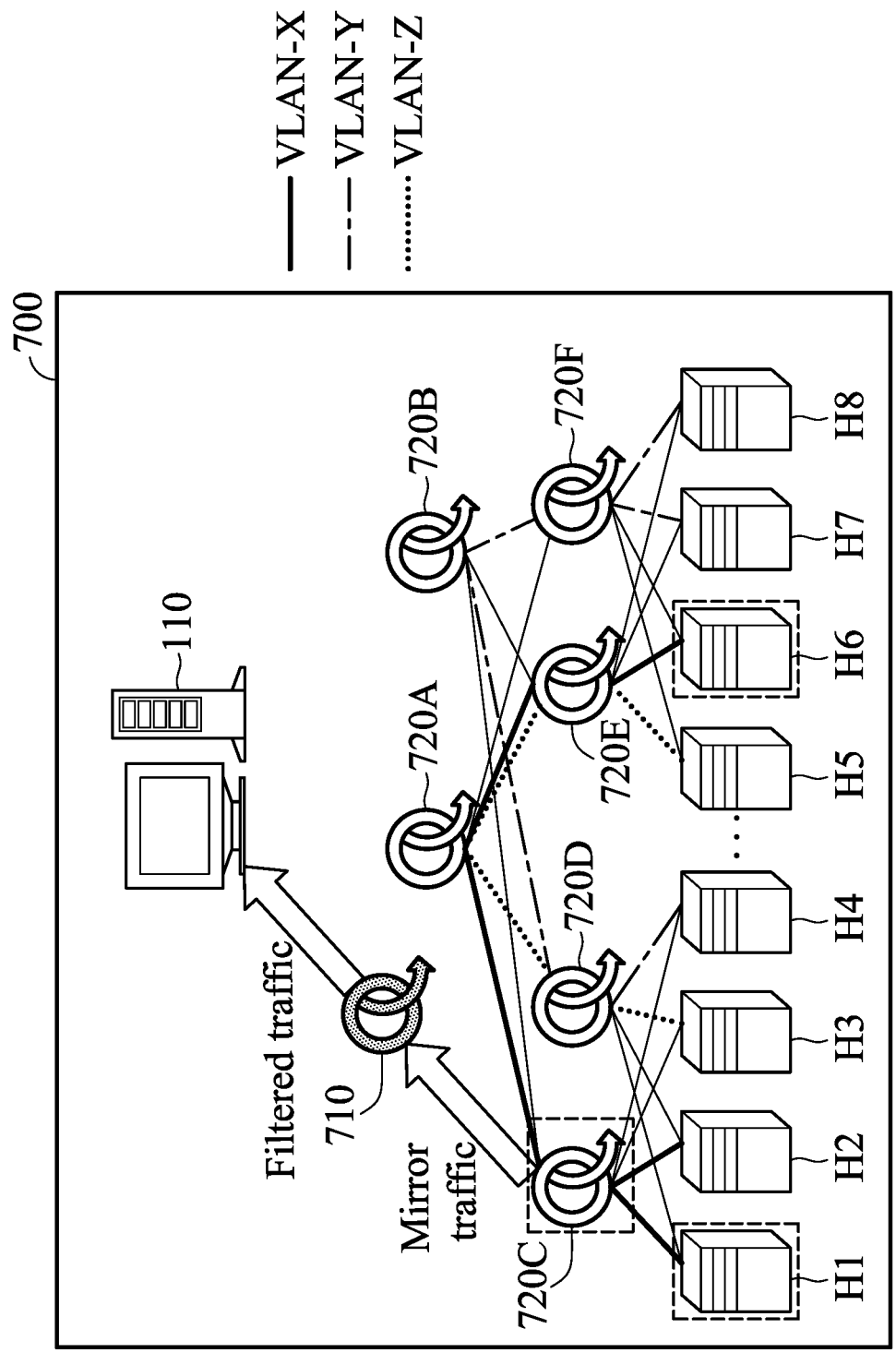
FIG. 7B is a schematic diagram of an OpenFlow switch used to filter the mirror traffic in a network system in accordance with the disclosure.

FIG. 7B is a schematic diagram of an OpenFlow switch used to filter the mirror traffic in a network system 700 in accordance with an exemplary embodiment of the disclosure. Unlike the network system of FIG. 7A, an OpenFlow switch 710 can be added in FIG. 7B to filter the mirror traffic. In another exemplary embodiment, each of the OpenFlow switches 720A~720F is configured to set a class of service (CoS) field in the header of the packet in the mirror traffic as a preset value X after receiving the packet, such that the OpenFlow switch 710 can filter the received traffic based on the value of the CoS field. In another exemplary embodiment, each of the OpenFlow switches 720A~720F may add a VLAN tag field to the header of the packet in the mirror traffic after receiving the packet, such that the OpenFlow switch 710 can filter the received traffic based on the value of the VLAN tag field. In addition, the value of the newly added VLAN tag field may be different from that of the VLAN tag corresponding to the plurality of virtual networks.

As shown in FIG. 7B, it is assumed that the OpenFlow switch 720C is a mirror switch selected by the cloud management device 110. The cloud management device 110 can use the OpenFlow switch 710 to filter the mirror traffic to reduce the mirror traffic received by the cloud management device 110 before receiving the mirror traffic transmitted by the mirror switch. The cloud management device 110 can set a plurality of filtering rules in the OpenFlow switch 710. In the exemplary embodiment, one of the filtering rules may be whether the value of the CoS field in the packet is a preset value X. When the OpenFlow switch 710 determines that the value of the CoS field in the packet is the preset value X, the OpenFlow switch 710 transmits the packet to the cloud management device 110. When the OpenFlow switch 710 determines that the value of the CoS field in the packet is not the preset value X, the OpenFlow switch 710 discards the packet. Therefore, the mirror traffic received by the cloud management device 110 is the filtered traffic that has been filtered by the OpenFlow switch 710. The cloud management device 110 can perform the packet payload analysis on the filtered traffic.

Figure 8:
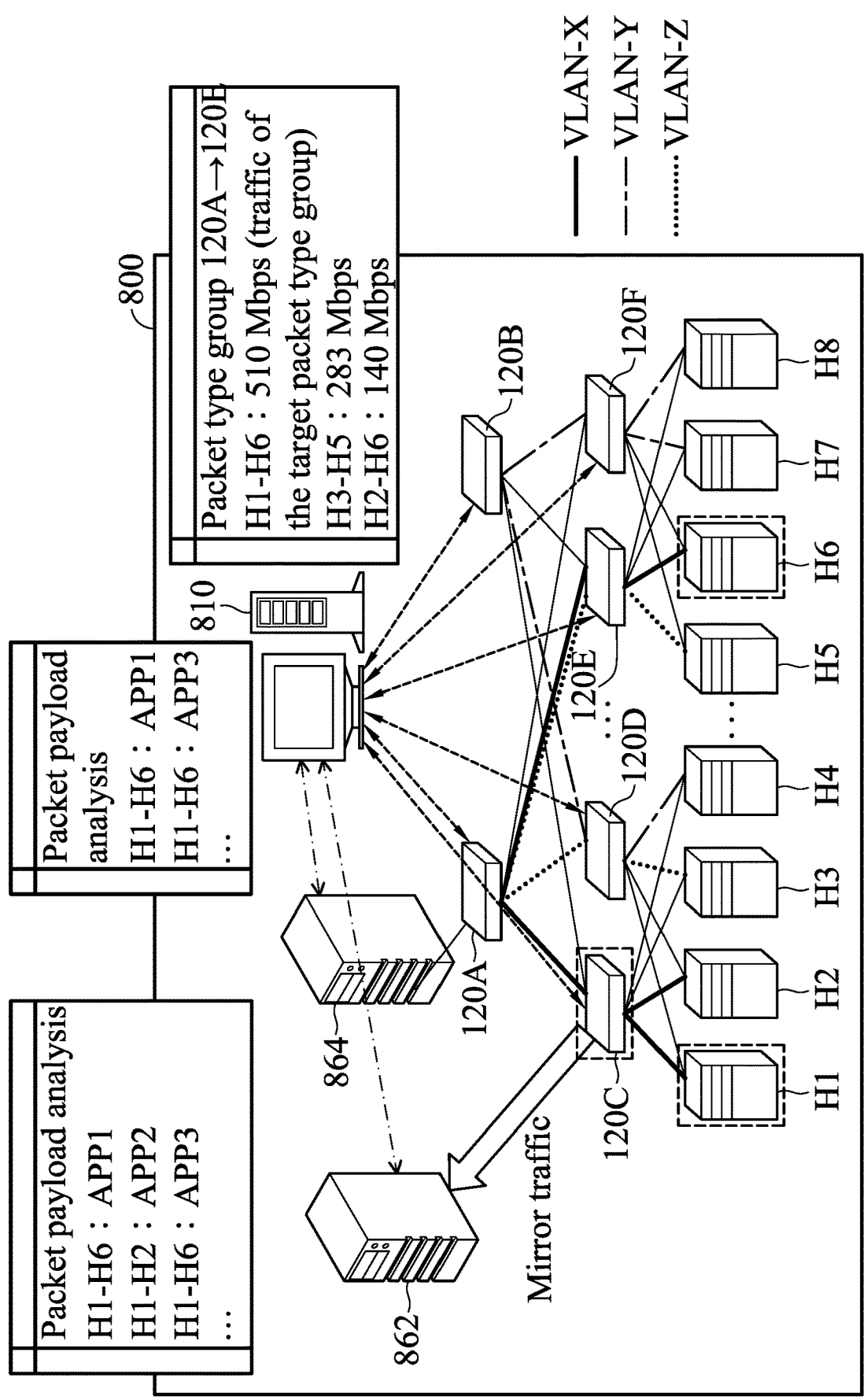
FIG. 8 is an alternative schematic diagram illustrating a network system in accordance with the disclosure.

FIG. 8 is an alternative schematic diagram illustrating a network system 800 in accordance with an exemplary embodiment of the disclosure. Unlike the network system of FIG. 1E, the packet payload analyzers 862 and 864 may be further included in FIG. 8, wherein the packet payload analyzers 862 and 864 are configured to perform the packet payload analysis on the mirror traffic to alleviate the work load of the cloud management device 810. In the exemplary embodiment, the packet payload analyzers 862 and 864 can be disposed at different locations in the network system 800. The cloud management device 810 can determine which packet payload analyzer performs the packet payload analysis according to a forwarding path of the mirror traffic and the locations of the packet payload analyzers 862 and 864. For example, in FIG. 8, it is assumed that the cloud management device 810 selects the switch 120C as the mirror switch. Since the distance between the mirror switch 120C and the packet payload analyzer 862 is less than that between the mirror switch 120C and the packet payload analyzer 864, the cloud management device 810 can instruct the mirror switch 120C to transmit the mirror traffic to the packet payload analyzer 862 for performing the packet payload analysis. The cloud management device 810 can request the packet payload analyzer 862 to analyze the target packet type group whose source host is H1 and whose destination host is H6 to determine the actual traffic used by different network applications.

Figure 9:
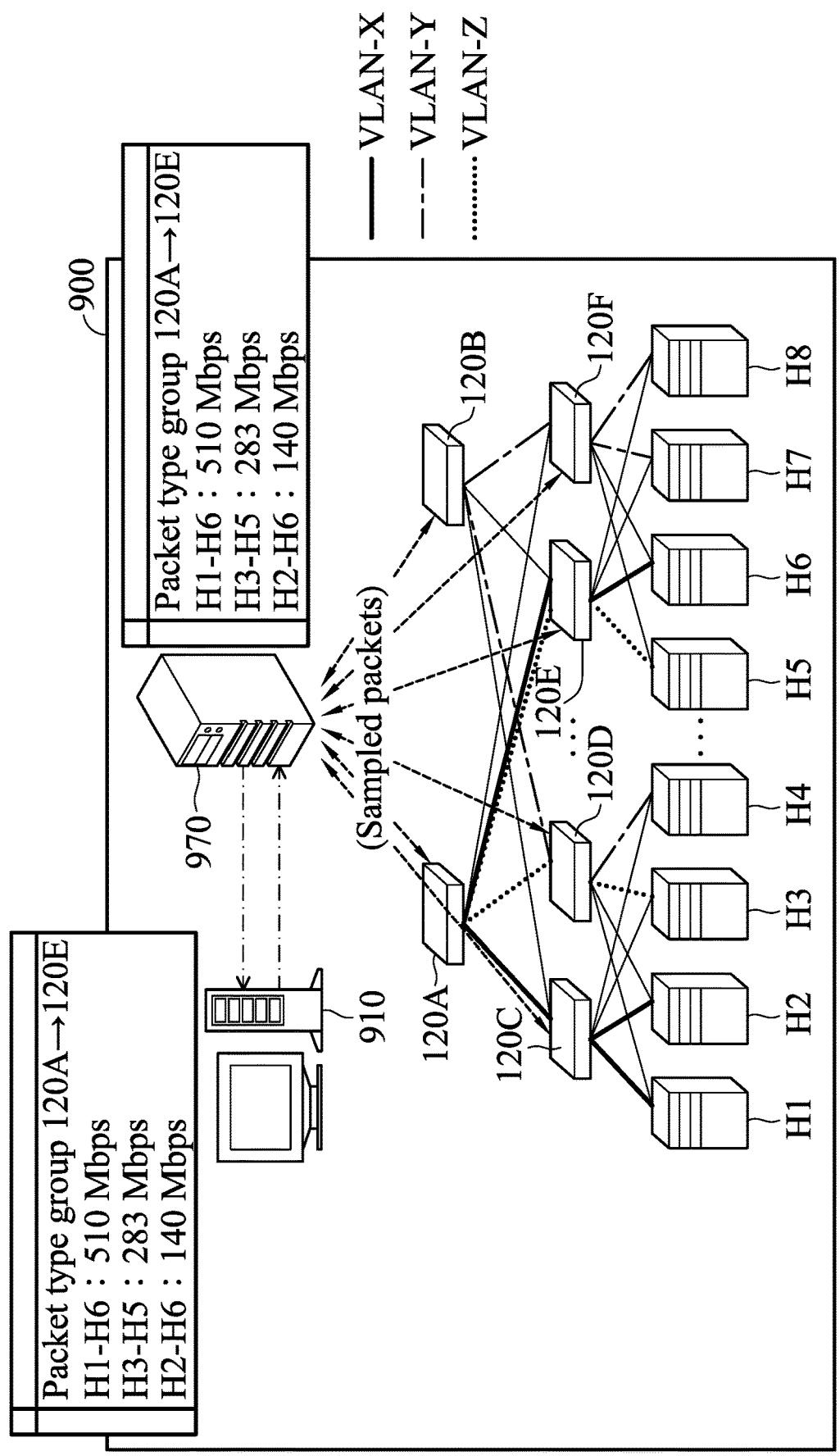
FIG. 9 is a schematic diagram illustrating a network system according to the disclosure.

FIG. 9 is a schematic diagram illustrating a network system 900 according to an exemplary embodiment of the disclosure. Unlike the network system of FIG. 1D, a sample analyzer 970 may be further included in FIG. 9, wherein the sample analyzer 970 samples the packets received by the switch 120A and the switch 120E at a sampling frequency and analyzes the packet types of the packets passing through each physical link and the traffic load of each physical link to alleviate the work load of the cloud management device 910. In another exemplary embodiment, the sample analyzer 970 can dynamically change the sampling frequency of each switch. The cloud management device 910 can request the sample analyzer 970 to provide the results of analyzing the sampled packets to obtain the result of the load analysis for each link.

In addition, the CPU 308 could execute the program code 312 to perform all of the above-described actions and steps or others described herein.

As shown above, a switch with low overhead can be intelligently selected as a mirror switch through the method and apparatus for monitoring the traffic in a network. The mirror switch can dynamically initiate the port mirroring mechanism to reduce the cost of analyzing the packet load and may enable the network operator to know the traffic source or the application service that causes link congestion.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in ways that vary for each particular application, but such implementation decisions should not be interpreted as causing a departure from the scope of the disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or another programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. It should be understood that the specific order or hierarchy of steps in the processes may be rearranged while remaining within the scope of the disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of exemplary embodiment, it should be understood that the disclosure is not limited thereto. Those who are skilled in this technology can still make various alterations and modifications without departing from the scope and spirit of this disclosure. Therefore, the scope of the disclosure shall be defined and protected by the following claims and their equivalents.

What is claimed is:

1. A method for monitoring traffic in a network, applied to a communication device, wherein the network is formed by switches and hosts, and the method comprises:
    collecting link layer discovery protocol (LLDP) information, virtual local area network (VLAN) information, host network interface card (NIC) information and host-tenant mapping information to obtain a physical network topology and a plurality of virtual network topologies;
    detecting a plurality of physical link loads of the physical network topology;
    obtaining a target path between two of the hosts or between the switches by analyzing the virtual network topologies;
    selecting one of the switches on the target path to serve as a mirror switch according to the physical link load corresponding to the target path or a hop count; and
    receiving mirror traffic transmitted from the mirror switch and performing packet payload analysis on the mirror traffic.

2. The method for monitoring traffic in a network as claimed in claim 1, wherein the step of obtaining the target path between two of the hosts or between the switches by analyzing the virtual network topologies further comprises:
    selecting a highest physical link load from the physical link loads and obtaining a first physical link corresponding to the highest physical link load by analyzing the physical network topology; and
    obtaining the target path by analyzing packet types of packets passing through the first physical link and the traffic load of each packet type.

3. The method for monitoring traffic in a network as claimed in claim 2, wherein the step of obtaining the target path by analyzing the packet types of packets passing through the first physical link and the traffic load of each packet type comprises:
    receiving header information transmitted by a first switch and a second switch, wherein the header information is generated according to headers of sampled packets encapsulated by the first switch and the second switch, and the first physical link is connected to the first switch and the second switch;
    obtaining the packet types of packets passing through the first physical link and the traffic load of each packet type according to the header information; and
    selecting a physical path corresponding to the packet type with the highest traffic load as the target path.

4. The method for monitoring traffic in a network as claimed in claim 1, wherein the step of detecting the physical link loads of the physical network topology is implemented by performing a simple network management protocol (SNMP).

5. The method for monitoring traffic in a network as claimed in claim 1, wherein the step of selecting one of the switches on the target path as the mirror switch comprises:
    obtaining a plurality of candidate switches forming the target path and link loads corresponding to the candidate switches; and
    selecting the mirror switch from the candidate switches according to the link load corresponding to each candidate switch or the hop count corresponding to each candidate switch;
    wherein the hop count is the number of links between each candidate switch and the communication device.

6. The method for monitoring traffic in a network as claimed in claim 1, wherein before receiving the mirror traffic transmitted from the mirror switch, the method further comprises:
    setting a plurality of filtering rules on an OpenFlow switch;
    filtering the mirror traffic according to the filtering rules; and
    receiving the filtered mirror traffic filtered by the OpenFlow switch.

7. The method for monitoring traffic in a network as claimed in claim 1, wherein before the mirror switch transmits the mirror traffic, the mirror switch adds a virtual local area network (VLAN) tag field to headers of packets of the mirror traffic.

8. The method for monitoring traffic in a network as claimed in claim 1, wherein before the mirror switch transmits the mirror traffic, the mirror switch adds a class of service (CoS) field to headers of packets of the mirror traffic.

9. The method for monitoring traffic in a network as claimed in claim 1, wherein the switches are OpenFlow switches.

10. The method for monitoring traffic in a network as claimed in claim 1, wherein the network is an Ethernet network.

11. A communication device for monitoring traffic in a network, wherein the network is formed by switches and hosts and the communication device comprises:
   a control circuit;
   a processor installed in the control circuit; and
   a memory installed in the control circuit and operatively coupled to the processor;
   wherein the processor is configured to execute program codes stored in the memory to:
   collect link layer discovery protocol (LLDP) information, virtual local area network (VLAN) information, host network interface card (NIC) information and host-tenant mapping information to obtain a physical network topology and a plurality of virtual network topologies;
   detect a plurality of physical link loads of the physical network topology;
   obtain a target path between two of the hosts or between the switches by analyzing the virtual network topologies;
   select one of the switches on the target path to serve as a mirror switch according to the physical link load corresponding to the target path or a hop count; and
   receive mirror traffic transmitted from the mirror switch and perform packet payload analysis on the mirror traffic.

12. The communication device for monitoring traffic in a network as claimed in claim 11, wherein using the processor to obtain the target path between two of the hosts or between the switches by analyzing the virtual network topologies further comprises:
   selecting the highest physical link load from the physical link loads and obtaining a first physical link corresponding to the highest physical link load by analyzing the physical network topology; and
   obtaining the target path by analyzing packet types of packets passing through the first physical link and the traffic load of each packet type.

13. The communication device for monitoring traffic in a network as claimed in claim 12, wherein using the processor to obtain the target path by analyzing the packet types of packets passing through the first physical link and the traffic load of each packet type further comprises:
   receiving header information transmitted by a first switch and a second switch, wherein the header information is generated according to headers of sampled packets encapsulated by the first switch and the second switch, and the first physical link is connected to the first switch and the second switch;
   obtaining the packet types of packets passing through the first physical link and the traffic load of each packet type according to the header information; and
   selecting a physical path corresponding to the packet type with the highest traffic load as the target path.

14. The communication device for monitoring traffic in a network as claimed in claim 11, wherein the processor detects the physical link loads of the physical network topology by performing a simple network management protocol (SNMP).

15. The communication device for monitoring traffic in a network as claimed in claim 11, wherein using the processor to select one of the switches on the target path as the mirror switch further comprises:
   obtaining a plurality of candidate switches forming the target path and link loads corresponding to the candidate switches; and
   selecting the mirror switch from the candidate switches according to the link load corresponding to each candidate switch or the hop count corresponding to each candidate switch;
   wherein the hop count is the number of links between each candidate switch and the communication device.

16. The communication device for monitoring traffic in a network as claimed in claim 11, wherein before receiving the mirror traffic transmitted from the mirror switch, the processor is further configured to execute program codes to execute:
   setting a plurality of filtering rules on an OpenFlow switch;
   filtering the mirror traffic according to the filtering rules; and
   receiving the filtered mirror traffic filtered by the OpenFlow switch.

17. The wireless communication device for monitoring traffic in a network as claimed in claim 11, wherein before the mirror switch transmits the mirror traffic, the mirror switch adds a virtual local area network (VLAN) tag field to headers of packets of the mirror traffic.

18. The wireless communication device for monitoring traffic in a network as claimed in claim 11, wherein before the mirror switch transmits the mirror traffic, the mirror switch adds a class of service (CoS) field to headers of packets of the mirror traffic.

19. The wireless communication device for monitoring traffic in a network as claimed in claim 11, wherein the switches are OpenFlow switches.

20. The wireless communication device for monitoring traffic in a network as claimed in claim 11, wherein the network is an Ethernet network.

* * * * *